UNITED STATES PATENT OFFICE.

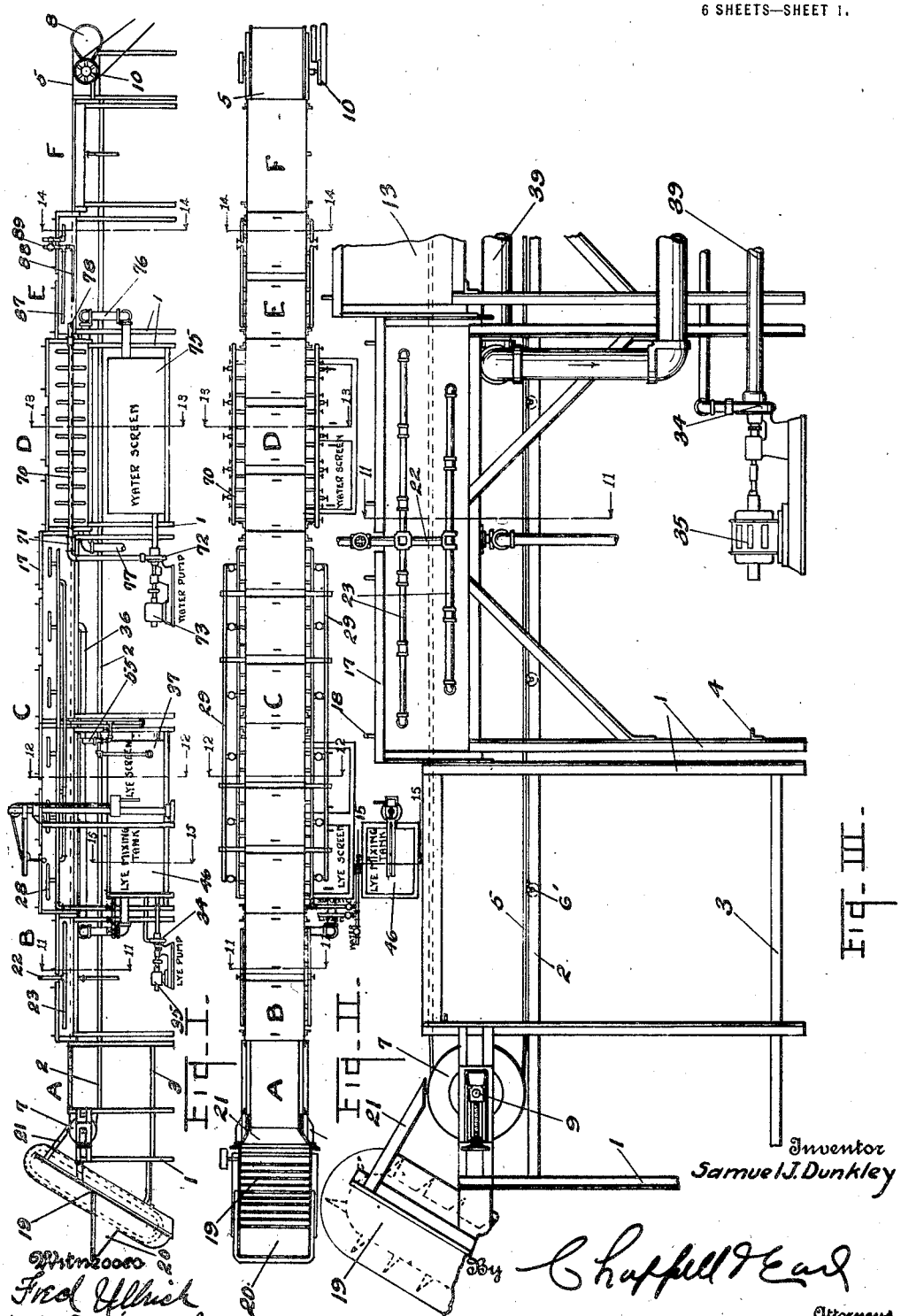

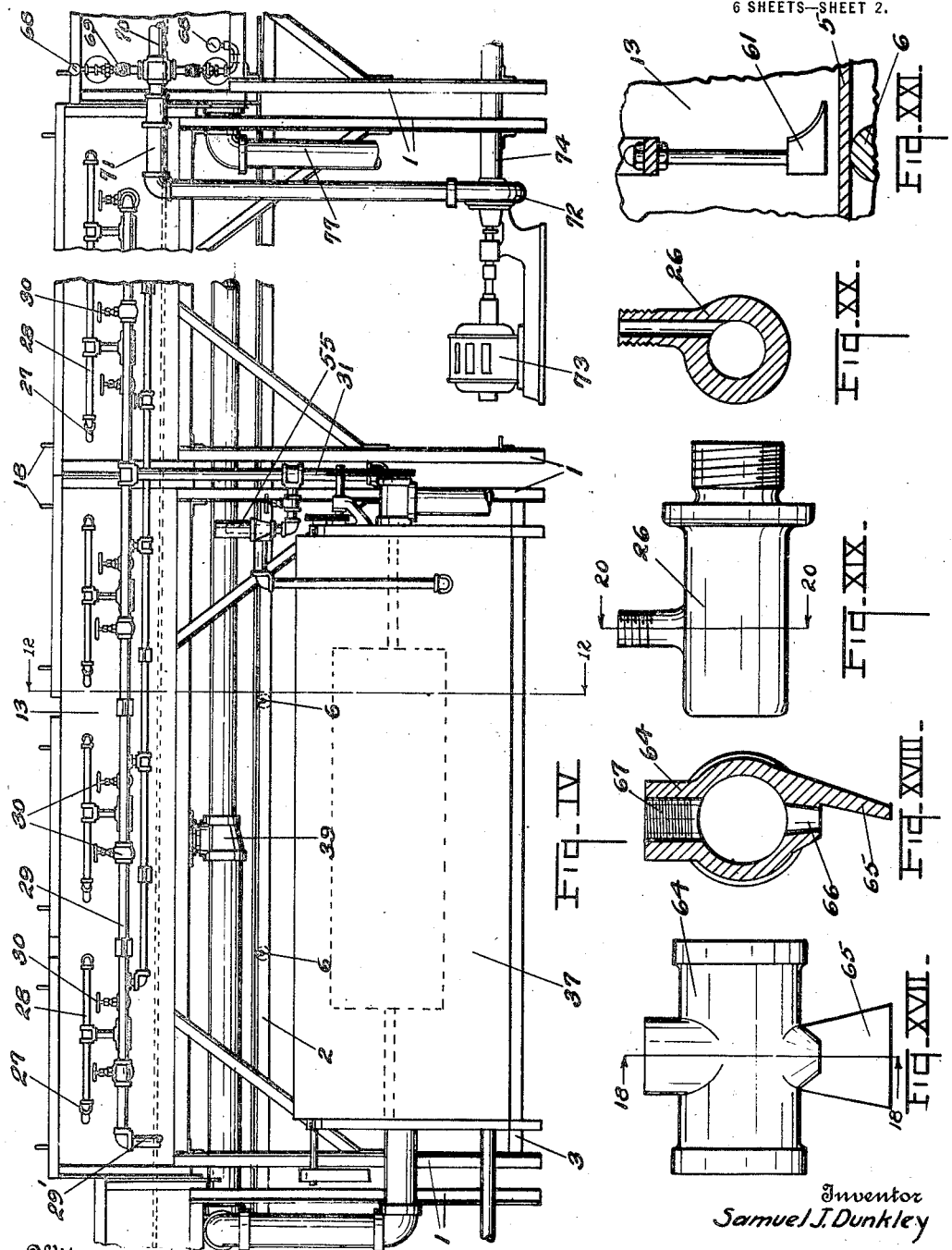

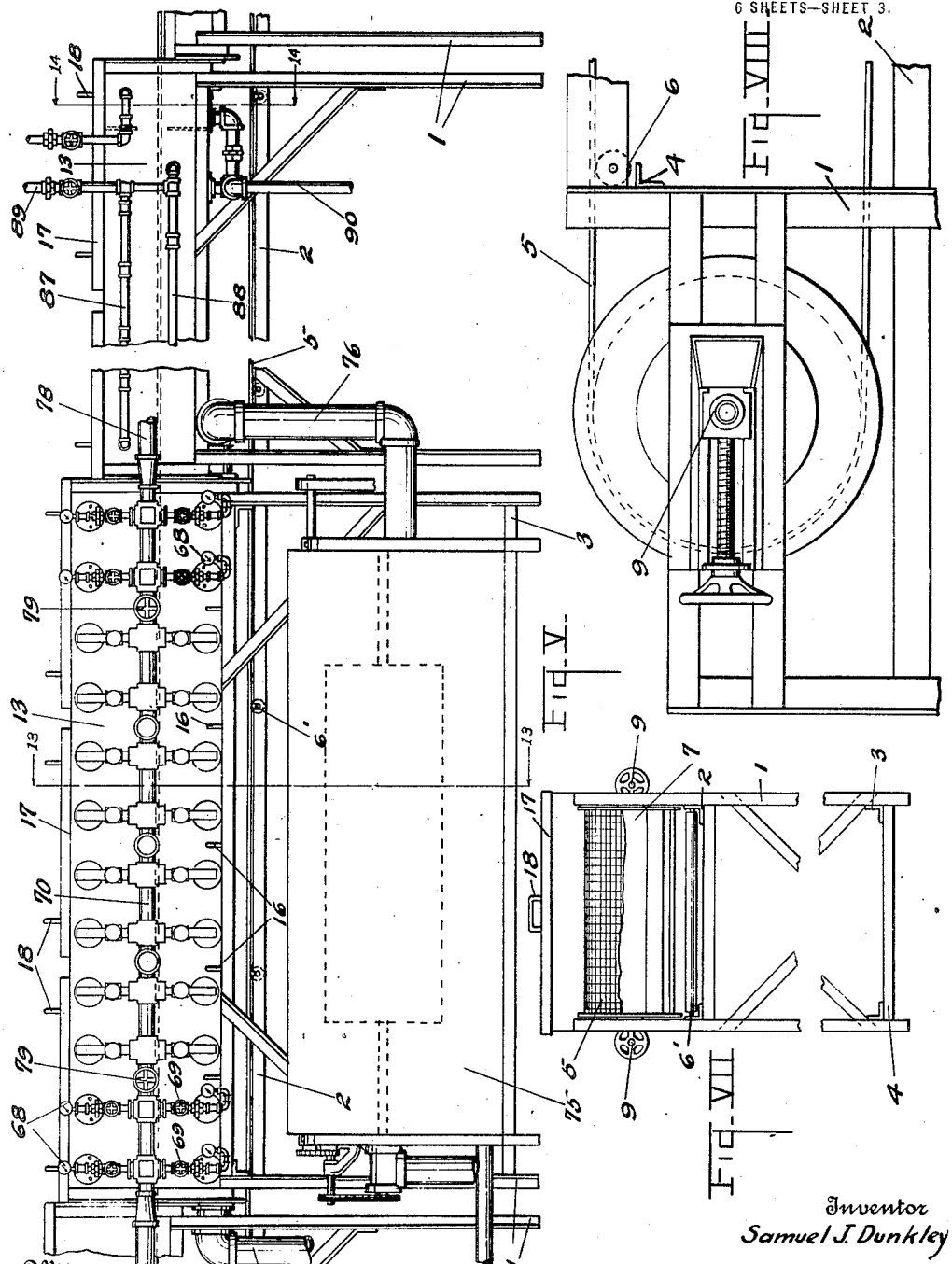

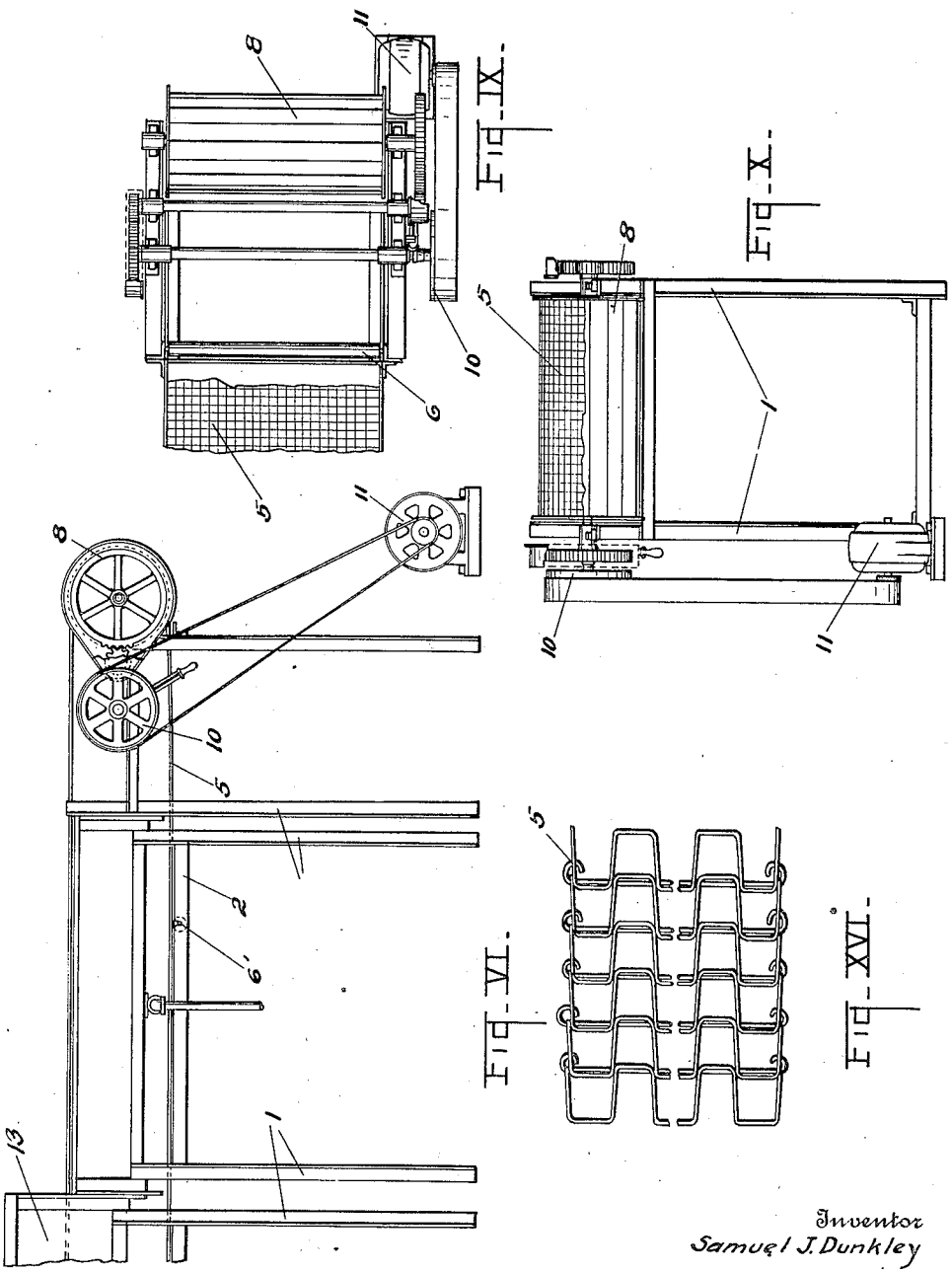

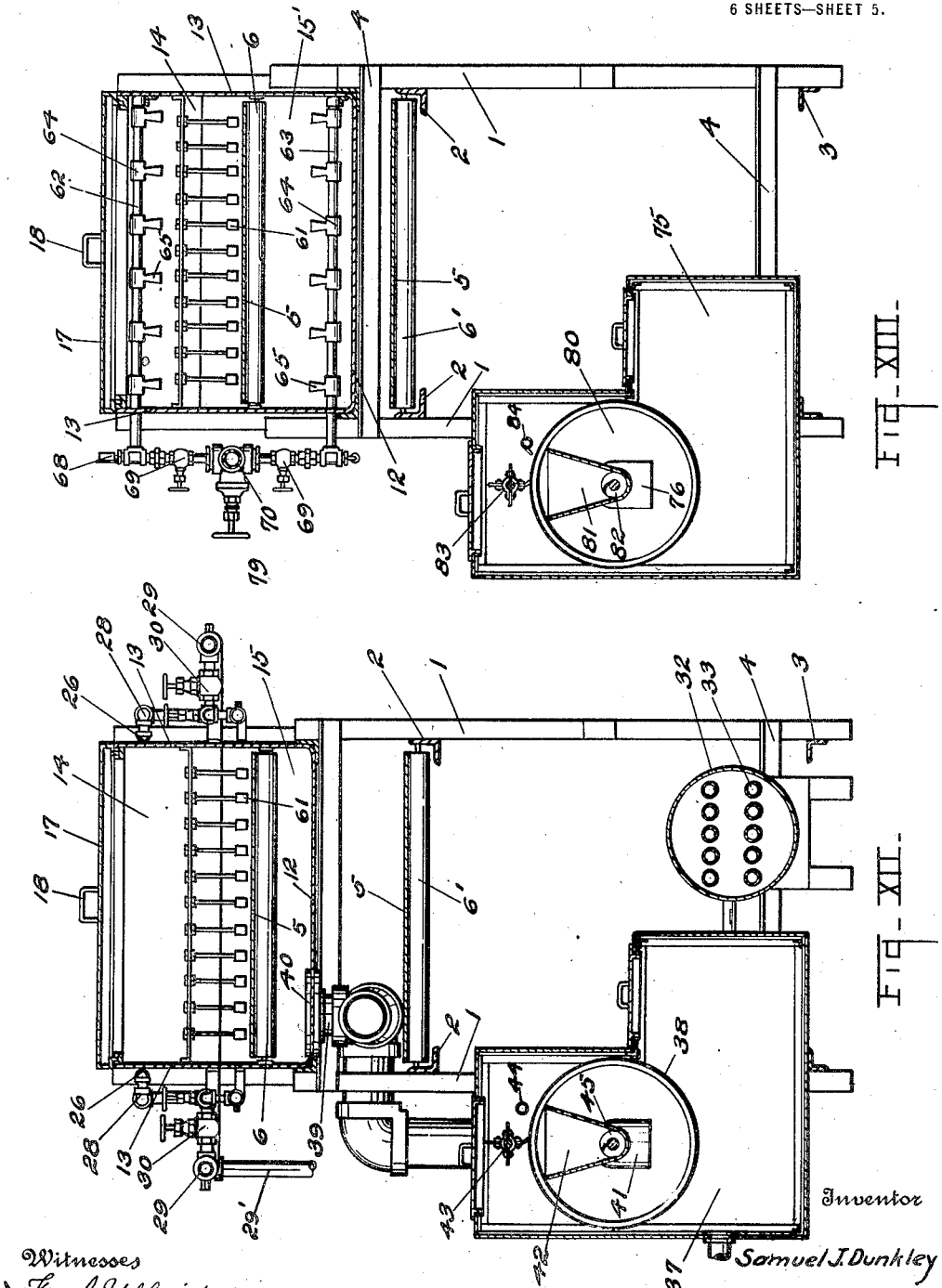

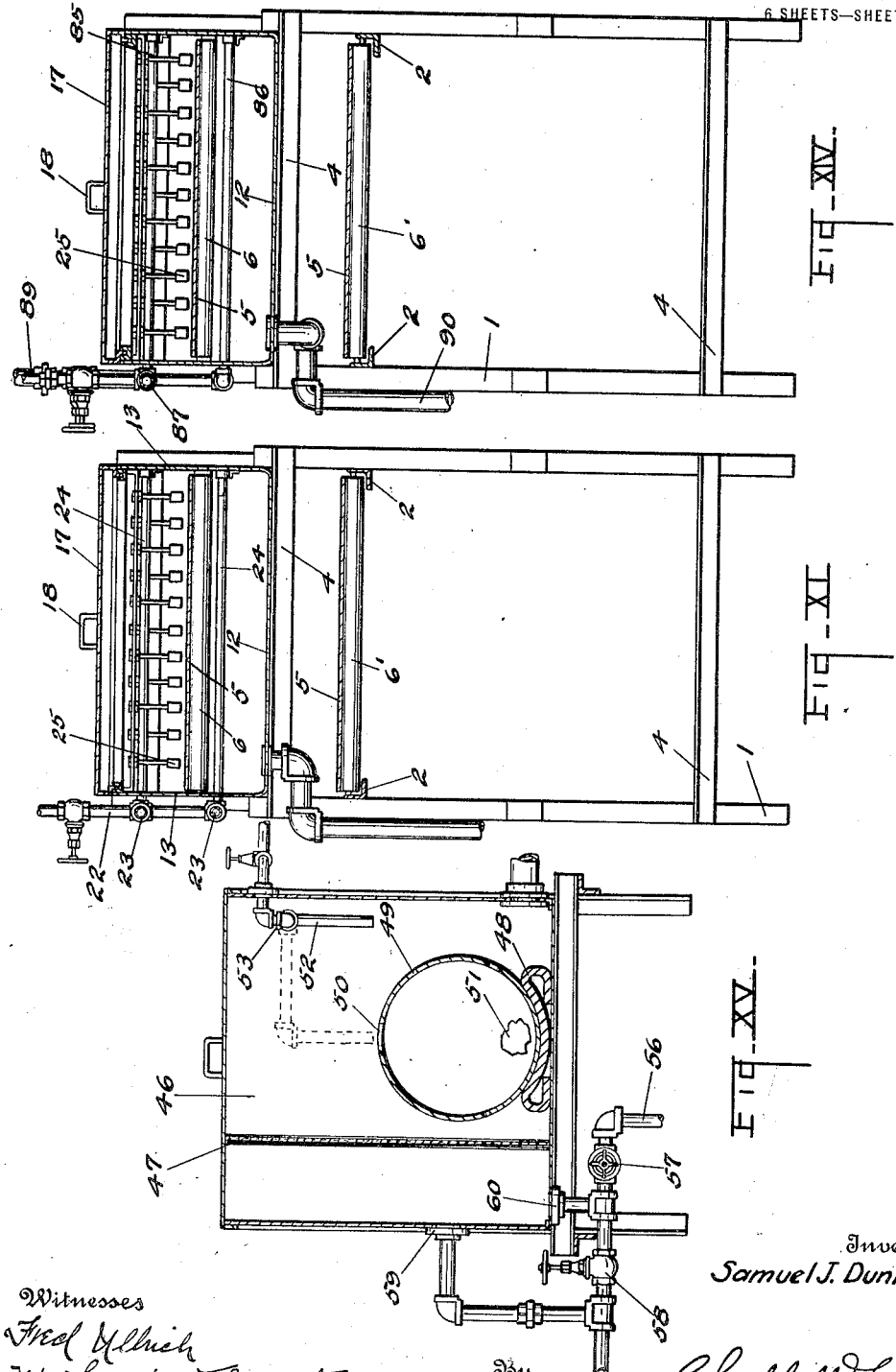

SAMUEL J. DUNKLEY, OF KALAMAZOO, MICHIGAN, ASSIGNOR TO DUNKLEY COMPANY, OF KALAMAZOO, MICHIGAN, A CORPORATION OF MICHIGAN.

PEELING APPARATUS AND PROCESS.

1,427,270.  Specification of Letters Patent.  Patented Aug. 29, 1922.

Application filed January 28, 1919, Serial No. 273,595. Renewed February 6, 1922. Serial No. 534,593.

*To all whom it may concern:*

Be it known that I, SAMUEL J. DUNKLEY, a citizen of the United States, residing at the city and county of Kalamazoo, State of Michigan, have invented certain new and useful Improvements in Peeling Apparatus and Processes, of which the following is a specification.

This invention relates to improvements in peeling apparatus and processes, the same being especially adapted to peaches, apricots and vegetables.

I am filing concurrent patent applications to take care of certain details of the apparatus and of the process, Serial Numbers 273,596 and 273,597.

The objects of the invention are:

First, to provide an effective apparatus for the handling of fruit such as peaches or apricots, or certain vegetables such as sweet potatoes and the like, whereby the peel is disintegrated and then removed by hydraulic jet action.

Second, to provide an improved continuous process of handling of such fruit or vegetables.

Third, to provide an improved process of developing a spray or mist charged with a disintegrating agent, such as caustic soda or other caustic.

Fourth, to provide the different details of operation as they are organized and brought together in a continuous machine.

Further objects, and objects relating to details and economies of construction and operation, will definitely appear from the detailed description to follow.

I accomplish the objects of my invention by the devices and means and mechanism described and pointed out in the specification. The invention is clearly defined in the claims.

A structure which is a preferred embodiment of my apparatus and especially well adapted for carrying out my improved process is clearly illustrated in the accompanying drawing forming a part of this specification, in which—

Fig. I is a reduced elevation view indicating the relation of the different parts.

Fig. II is a plan view of the structure appearing in Fig. I, showing the relations of the different parts.

Fig. III is an enlarged detail elevation view of the left hand or receiving and preheating end portion of the apparatus, generally indicated by the reference letters A and B.

Fig. IV is an enlarged side elevation view of the "lye" section, indicated by the general reference letter C.

Fig. V is a similar enlarged detail side elevation view of the water spray section and blanching section, indicated by the general reference letters D and E.

Fig. VI is an enlarged detail side elevation view of the inspection table end of the machine, indicated by the general reference F, and showing the driving motor and connections.

Fig. VII is a detail end elevation view from the feeding end, that is, the left hand end, of Figs. I, II and III, the elevator being omitted.

Fig. VIII is an enlarged detail side elevation view of the pulley tightener for properly tensioning the metallic openwork conveyor belt 5.

Fig. IX is an enlarged detail plan view of the right hand end portion of the machine, being the right hand end portion of Figs. I, II and VI, showing the driving connections for driving the conveyor belt 5.

Fig. X is an enlarged end elevation view from the said right hand end of Figs. I, II, VI and IX.

Fig. XI is an enlarged detail transverse sectional elevation view taken on line 11—11 of Figs. I and III, through the preheating part of the apparatus or machine.

Fig. XII is an enlarged detail transverse sectional elevation view taken on line 12—12 of Figs. I, II and IV through the lying or disintegrating section of the machine, showing the relation and arrangement of parts and the various tanks in that behalf.

Fig. XIII is an enlarged detail transverse sectional elevation view on line 13—13 of Figs. I, II and VI, showing the general arrangement of parts and disposition of the water supply means.

Fig. XIV is a transverse detail sectional elevation taken on line 14—14 of Figs. I, II and V of the blanching section.

Fig. XV is an enlarged detail sectional view through the lye receiving and mixing tank and means, taken on line 15—15 of Figs. I and II.

Fig. XVI is an enlarged detail plan view of a portion of the openwork metallic conveyor belt.

Fig. XVII is a detail elevation view of one of the water spray nozzles for delivering the water in a broad jet onto the peaches or other material on the conveyor.

Fig. XVIII is a sectional view on line 18—18 of Fig. XVII, showing the details of construction of such water spray nozzle.

Fig. XIX is an elevation view of one of the lye spray nozzles.

Fig. XX is a transverse sectional elevation taken on line 20—20 of Fig. XIX, showing details of such lye spray nozzle.

Fig. XXI is a detail sectional elevation taken on line 21—21 of Figs. XII and XIII, showing one of the little plow members for turning and agitating the load on the belt.

In the drawing, similar reference characters refer to similar parts throughout the several views, and the sectional views are taken looking in the direction of the little arrows at the ends of the section lines.

Considering the numbered parts of the drawing, a general framework is provided for supporting the various parts comprising suitable legs 1 with longitudinal rails 2 toward the upper part and longitudinal rails 3 toward the lower part, with suitable cross bars 4 at such intervals as may be required.

Carrying rolls 6 6' for supporting the upper and lower run of the endless conveyor belt 5 are provided at suitable intervals throughout the entire length of the machine, the length of the machine being oftentimes several hundred feet, depending on the capacity of the machine. This conveyor belt 5 is carried and driven from the drum 8 at the tail of the machine and is carried at the front of the machine by the drum 7. The drum 7 is provided with a belt tightener means 9, clearly illustrated in Figs. III and VIII. The machine is driven preferably by electric motor 11 to a pulley 10 with a suitable clutch which is connected by a suitable gear train to drive the drum 8. These parts are shown in a general way in Figs. I, VI and IX, but as my invention does not relate to the details of these devices I have not shown them in detail.

A suitable housing or trough-like casing open at both ends is provided extending the entire length of the machine, consisting of a bottom 12 and sides 13, 13. Partial partitions 14 extend down from the top to divide this casing into the various sections, the lower edge of the partitions being at such elevation that the conveyor belt and its load passes underneath the lower edge. The lye section in the bottom portion is separated by suitable partitions 15 extending up from the bottom at each side of the section so that the lye that drips down can be collected and returned into the system.

The water section is also provided with upwardly extending partitions 15' at the bottom at each end to collect the water, and adjustable partitions 16 are provided at intervals for dividing the water section, thus conserving the use of the water (see Fig. V).

The top of this entire casing is made of removable sections 17 of the cover which can be lifted off for inspection and repair. These are suitably flanged and provided with seal or packing, as clearly appears in the various sectional views. Handles 18 are provided on the top of each cover section for conveniently handling the same.

An elevator 19 is provided for delivering the fruit or vegetable to be peeled to the receiving end of the machine. The lower end of this conveyor extends down into a hopper shaped tank 20 which is filled with water, so that the fruit or vegetable is dumped into the tank of water where it floats and is gently engaged and elevated by the endless conveyor elevator and delivered and fed onto the receiving end of the conveyor belt 5, this being the receiving section marked with the general reference letter A in Figs. I, II and III. An oscillating conveyor chute 21 is provided from the upper end of the elevator, delivering downwardly to the conveyor belt so that the fruit is delivered easily without bruising.

The conveyor then carries the fruit to the preheating section B. Steam pipes 24 are provided above and below the upper run of the conveyor belt and are perforated to deliver jets of steam onto the surface of the fruit or vegetable load on the belt. The steam is delivered at such a temperature and rate as merely to heat the surface without any cooking action. The heat is conserved by the skins of the peaches having been previously wetted. The steam is delivered from any suitable source through the pipe 22 to the headers 23, 23, to the said perforated cross pipes 24, 24 (see Fig. XI).

The load on the conveyor belt, when it has been thus heated, is carried into the lying section C. This section is provided with means for delivering the lye solution upon the peaches or other load upon the belt, in a very fine mist at a high temperature, and means are provided for agitating the load on the belt, consisting of small plows 25 so that every part is acted upon.

The lye or disintegrating solution at a high temperature is delivered through the lye spray nozzles 26. These nozzles are secured to the sides 13 of the casing and deliver above and are constructed similar to fruit spraying nozzles. The solution is delivered to them under a high pressure and at a temperature of about 230° F. These spray nozzles are provided in groups 27 supplied from the auxiliary headers 28 which are connected to a main header 29 extending the entire length of the lye section. Suitable globe valves 30 are provided for controlling these different groups and sections, so that the amount of lye made use of can thus be very readily regulated. These headers are provided for both sides of the casing, so that the lye solution is sprayed in a very fine mist into both sides of the chamber formed by the main casing.

The main header 29 is provided by connections 31 to the lye solution heating tank 32. This tank is heated by steam coil 33 and the air space and the steam space in this tank 32 assist the efficient and even action of the lye pump. The lye solution is delivered by the centrifugal pump 34 which is driven by direct connected electric motor 35. The centrifugal pump is and of itself will of course maintain an even pressure without any air chamber or steam space.

I provide a storage tank 37 for lye solution, to which the suction of the pump is connected.

I provide a rotary screen 38 for screening the debris from the lye so that the lye can be used a second time. The lye section of the machine is drained into this screen 38 through the drain pipe 39 connected by flange 40 to the bottom of the casing. This pipe 39 extends axially into the rotary screen 38 at 41. The debris is accumulated on the inner surface of the screen is carried upwardly over a discharge trough 42 and is jarred by the rotary flexible tapper 43 at the upper surface, which shakes the debris into the discharge trough 42.

44 is a steam pipe which also delivers jets of steam down through the upper part of the screen and assists in clearing the same and discharging the debris into the hopper 42. Where there is a sufficient steam supply, I prefer the steam as the exclusive means for clearing the screen. A screw conveyor 45 is located in the bottom of trough 42 for discharging the debris therefrom. Of course only a small amount of peel is removed from the fruit or vegetable in this section so there is very little accumulation, but it is desirable to screen the same out in order that the spray at the nozzle may be effectively delivered and also so there shall be no clogging.

The lye is introduced into the solution through the lye mixing tank 46, which is provided with a screen 47 at one side. A cradle 48 is provided to receive a drum 49 of the lye, preferably caustic soda. The drum is introduced into this tank, with a hole chopped in the top side at 50 and with openings 51 in the opposite heads toward the bottom side thereof.

Water or lye solution is delivered through pipe 52 which is provided with a swinging nozzle 53 so that the same may be swung over the opening 50 in the top side of the drum, and a steam pipe 54 is provided with connection so that the steam can also be introduced at the same point to apply heated steam and water to the contents of the drum.

The pipe 52 is connected to the header 29 preferably at the end thereof so that by a proper opening of the valves the solution in the heater tank can be passed into contact with the supply of caustic in the mixing tank until the proper strength, indicated by hygrometric test, is attained, which of course will vary somewhat with conditions. The lye tester 55 clearly appears in Fig. IV. The fresh mixture is delivered from the tank 46 through the pipe 56 which is connected into the storage tank 37. Pipe 56 is branched and is controlled by suitable valves 57, 58 and connected to the tank 46 by suitable flanges 59 and 60. The flange connection 60 is on the bottom and 59 a considerable distance above the bottom on one side. By closing the bottom connection the solution can be taken from the higher opening, which is sometimes desirable for various reasons. There may be some small quantity of undissolved lye in the bottom of the tank and clear solution can be drawn off at the higher place. On the other hand, it may be desirable to raise the level of the solution in the drum in order to insure complete dissolving of the contents. The lye is delivered by the pump through the heater 32 onto the spray nozzles 26, through the header 29 by the pipe 29'. When the solution becomes weakened, the connection from the end of the header is opened and the weakened solution is passed to the mixing tank 46 where it takes up an additional quantity of lye, which flows into the storage tank 37, strengthening all of the lye in the system. If the solution becomes weakened and part of it is used up, water can be added through the connection to the nozzle 54 and the solution thus be replenished.

In this lye section the spray nozzles illustrated in detail in Figs. XIX and XX are used because of their centrifugal action. This tears the highly heated lye solution into a very fine spray. As the temperature is far above the boiling point of water, being preferably at about 230° Fahr., the water, when the pressure is released by the discharge into the lye section, at once largely changes to steam and the steam and liquid are at once condensed into a very fine mist which is very highly charged with caustic soda. This mist is so fine as to be comparable to a fog, and it permeates the entire interior of the casing so that if there is but a thin layer of fruit on the conveyor; this mist floats into contact with the entire surface of each peach or specimen thereof and in sufficient quantity to disintegrate the peel.

This caustic mist acts especially well upon the peel of a peach that has been previously wet and heated, as there is comparatively hot water saturated into the peel which readily takes up the caustic soda because of its moist condition. This secures very effective surface action, the caustic apparently being diluted as it penetrates by the presence of the water so that it has little or no tendency to penetrate beyond the peel. This preliminary soaking and steaming could of course be dispensed with where this caustic vapor is used, by the consumption of a little extra time and an extra amount of caustic.

After this treatment the disintegrated peel will be readily acted upon by sprays or peeling jets of water. A considerable layer of fruit can be acted upon by providing little plows 61 which are arranged at intervals in staggered relation and insure the opening of the load of fruit and turning of the fruit as it is carried along on the conveyor belt 5. However, as I have indicated, with thin layers of fruit the plows are not necessary because the entire surface will be acted upon by the heavy fog which is charged substantially to saturation with the caustic soda which is at a high temperature, in some instances above the boiling point of water.

When the peaches or other fruit loaded upon the conveyor have thus been acted upon and disintegrated by the lye, it is of course desirable that the peeling be immediately removed and the conveyor 5 with its load passes to the water section D (see Figs. V and XIII). Water may be delivered by pressure by any suitable means as from a city water main, but I prefer to provide a centrifugal rotary pump for the purpose and use the water over and over again, merely replenishing the amount as may be necessary.

The water is delivered above and below the upper run of the conveyor belt from cross pipes 62 above and 63 below, which are provided at intervals with water spray nozzles 64. These spray nozzles are seen in Figs. XIX and XX. They are formed like pipe couplings with a downwardly projecting deflector blade 65 beneath and with a discharge aperture 66 directed against the blade so that the jet will be spread into fan shape in a plane transverse to the direction of travel of the conveyor belt. The section is perforated opposite the nozzle opening for convenience in construction in drilling the discharged holes, and the perforation is closed by a plug 67. These nozzles are disposed at frequent intervals in the water chamber, and pressure gages 68 are provided for each so that the pressure delivered can be observed and regulated by the globe valves 69 provided for controlling the pressure to each cross pipe.

It is important that this pressure be thus under control because a strong pressure has an undue and wasteful action on over-ripe fruit, and the pressure can be regulated to nicely do the work. A very strong pressure of 100 lbs. or more to the quare inch is permissible on hard fruit.

These pipes 62 are connected to a suitable header 70 made up in sections and supplied at one end from the pipe 71 connected to receive water from the circulating centrifugal pump 72, the pump being driven by electric motor 73. The pump is supplied through pipe 74 which is connected to the storage tank 75 into which the water section drains through the pipe 76. A drain pipe 77 is provided at the opposite end of the water section, which delivers and discharges into the sewer. Water pipe 78 is connected to any fresh water supply, as a city main or the like, and provides the fresh water for the system.

The header 70 is divided in sections and can be divided between the fresh water supply or the circulation water supply by means of globe valves 79.

The bottom part of the casing of the water section is controlled by the adjustable partition 16, so that fresh water can be delivered to one or more of the sections through the pipe 78 and the header 70. As the water is discharged from the nozzles, it will be collected in the chamber beneath, and because of the partitions 16 that are adjusted at that point, the comparatively fresh water will drain out through the pipe 76 and be passed to the water screen.

The water delivered by the circulating pump, coming in through the pipe 71, can be drained at will out through the drain 77, or a part of the same can be allowed to drain through the pipe 76 into the system, so that the sprayers from the first sections where the great bulk of the peel is removed can be discharged directly into the sewer or waste, and the comparatively clean water can be passed through the screen and used over and over again. In practice the proportion drained and the proportion of fresh water are kept the same.

The water is delivered into the drum of the rotary screen 80 where the debris is collected and discharged into the discharge trough 81, which is provided with a screw conveyor 82 in its bottom. A revolving tapper 83 is provided to jar the debris from the inside of the screen in its uppermost position into the hopper 81. A perforated water pipe 84 is provided as an auxiliary to do this work by spray action, although where economy of water is not a particular object the entire clearing of the screen can be done with the water jets. The debris thus collected is discharged into the sewer or waste by the conveyor 81. It will thus be seen that in this water section the pressure of water, the number of sprays and the conserving of water is very readily and completely controlled.

When the fruit is washed in the water section, it is desirable to steam it and blanch it with hot water to develop and improve its condition and its firmness, and this is done in section E which is the blanching section (see Fig. XIV). This blanching section is precisely comparable with the preheating section. It is provided with perforated cross pipe 85 above and 86 below, which are connected to suitable headers 87 and 88 respectively. The steam or hot water is supplied from any suitable source through pipe 89. A suitable drainage pipe 90 is provided to carry off the used water and water of condensation.

After the fruit has thus been steamed and treated, it passes out from the blanching section to an uncovered portion F of the machine for inspection, such as is usual in canning establishments. The fruit can of course be delivered to sorting belts or tables.

I have described the apparatus of my invention in its preferred form and as I have indicated, I am claiming certain specific features in concurrent patent applications. The process here referred to can of course be carried on in structures widely differing in detail. I desire to claim the invention, both the apparatus and process, specifically and broadly, as indicated and pointed out in the appended claims.

Having thus described my invention, what I claim as new and desire to secure by Letters Patent is:

1. In an apparatus for peeling peaches or for similar work, the combination of a suitable framework carrying an endless metal openwork conveyor; a trough-like housing for the upper run of the conveyor comprising sides and bottom, with suitable cross partitions; an endless elevator conveyor for delivering fruit to the receiving end of the said openwork conveyor, with a hopper-shaped tank surrounding the lower end thereof; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply; and a blanching section with perforated pipe arranged above and below the said conveyor for delivering hot water or steam into contact with the load on the said belt, co-operating for the purpose specified.

2. In an apparatus for peeling peaches or for similar work, the combination of a suitable framework carrying an endless metal openwork conveyor; a trough-like housing for the upper run of the conveyor comprising sides and bottom, with suitable cross partitions; an endless elevation conveyor for delivering fruit to the receiving end of the said openwork conveyor, with a hopper-shaped tank surrounding the lower end thereof; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply, co-operating for the purpose specified.

3. In an apparatus for peeling peaches or for similar work, the combination of a suitable framework carrying an endless metal openwork conveyor; a trough-like housing for the upper run of the conveyor comprising sides and bottom, with suitable cross partitions; a preheating section comprising perforated steam pipes above and below the upper run of said belt for preheating the surfaces of the fruit load on the belt; a "lying" section comprising spray nozzles delivered into opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply; and a blanching section with perforated pipe arranged above and below the said conveyor for delivering hot water or steam into contact with the load on the said belt, co-operating for the purpose specified.

4. In an apparatus for peeling peaches or for similar work, the combination of a suitable framework carrying an endless metal openwork conveyor; a trough-like housing for the upper run of the conveyor comprising sides and bottom, with suitable cross partitions; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply, co-operating for the purpose specified.

5. In an apparatus for peeling peaches or for similar work, the combination of a suitable framework carrying an endless metal openwork conveyor; a trough-like housing for the upper run of the conveyor comprising sides and bottom, with suitable cross partitions; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply, co-operating for the purpose specified.

6. In an apparatus for peeling peaches or for similar work, the combination of a suitable framework carrying an endless metal openwork conveyor; a trough-like housing for the upper run of the conveyor comprising sides and bottom, with suitable cross partition; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; and a water section comprising cross pipes with spray nozzles thereon disposed above and below the upper run of the belt, co-operating for the purpose specified.

7. In an apparatus for peeling peaches or for similar work, the combination of a suitable framework carrying an endless metal openwork conveyor; a trough-like housing for the upper run of the conveyor comprising sides and bottom, with suitable cross partitions; a "lying" section comprising spray nozzles delivered into the opposite sides of the casing; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply, co-operating for the purpose specified.

8. In an apparatus for peeling peaches or for similar work, the combination of a suitable framework carrying an endless openwork conveyor; a trough-like housing for the upper run of the conveyor comprising sides and bottom, with suitable cross partitions; an endless elevator conveyor for delivering fruit to the receiving end of the said openwork conveyor, with a hopper-shaped tank surrounding the lower end thereof; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt; and a blanching section with perforated pipe arranged above and below the said conveyor for delivering hot water or steam into contact with the load on the said belt, co-operating for the purpose specified.

9. In an apparatus for peeling peaches or for similar work, the combination of a suitable framework carrying an endless metal openwork conveyor; a trough-like housing for the upper run of the conveyor comprising sides and bottom, with suitable cross partitions; an endless elevator conveyor for delivering fruit to the receiving end of the said openwork conveyor, with a hopper-shaped tank surrounding the lower end thereof; a preheating section comprising perforated steam pipes above and below the upper run of said belt for preheating the surfaces of the fruit load on the belt; a "lying" section comprising spray nozzles delivered into the opposite sides of the casing; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply; and a blanching section with perforated pipe arranged above and below the said conveyor for delivering hot water or steam into contact with the load on the said belt, co-operating for the purpose specified.

10. In an apparatus for peeling peaches or for similar work, the combination of a suitable framework carrying an endless openwork conveyor; a trough-like housing for the upper run of the conveyor comprising sides and bottom, with suitable cross partitions; a preheating section comprising perforated steam pipes above and below the upper run of said belt for preheating the surfaces of the fruit load on the belt; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt; and a blanching section with perforated pipe arranged above and below the said conveyor for delivering hot water or steam into contact with the load on said belt, co-operating for the purpose specified.

11. In an apparatus for peeling peaches or for similar work, the combination of a suitable framework carrying an endless openwork conveyor; a trough-like housing for the upper run of the conveyor comprising sides and bottom, with suitable cross partitions; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; a water section comprising cross pipes with spray nozzles thereon disposed above and below the upper run of the belt; and a blanching section with perforated pipe arranged above and below the said conveyor for delivering hot water or steam into contact with the load on the said belt, co-operating for the purpose specified.

12. In an apparatus for peeling peaches or for similar work, the combination of a suitable framework carrying an endless metal openwork conveyor; a trough-like housing for the upper run of the conveyor comprising sides and bottom, with suitable cross partitions; a preheating section comprising perforated steam pipes above and below the upper run of said belt for preheating the surfaces of the fruit load on the belt; a "lying" section comprising spray nozzles delivered into the opposite sides of the casing; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply; and a blanching section with perforated pipe arranged above and below the said conveyor for delivering hot water or steam into contact with the load on the said belt, co-operating for the purpose specified.

13. In an apparatus for peeling peaches or for similar work, the combination of a suitable framework carrying an endless metal openwork conveyor; a trough-like housing for the upper run of the conveyor comprising sides and bottom, with suitable cross partitions; a "lying" section comprising spray nozzles delivered into the opposite sides of the casing; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply; and a blanching section with perforated pipe arranged above and below the said conveyor for delivering hot water or steam into contact with the load on the said belt, co-operating for the purpose specified.

14. In an apparatus for peeling peaches or for similar work, the combination of a suitable framework carrying an endless openwork conveyor; a trough-like housing for the upper run of the conveyor comprising sides and bottom, with suitable cross partitions; a "lying" section comprising spray nozzles delivered into the opposite sides of the casing, an auxiliary tank for mixing the lye solution and maintaining the strength of said solution, a heated compression tank, and means for delivering lye solution from said tank under pressure to the spray nozzles; and a water section comprising cross pipes with spray nozzles thereon disposed above and below the upper run of the belt, co-operating for the purpose specified.

15. In an apparatus for peeling peaches or for similar work, the combination of a suitable framework carrying an endless metal openwork conveyor; a trough-like housing for the upper run of the conveyor comprising sides and bottom, with suitable cross partitions; a "lying" section comprising spray nozzle delivered into the opposite sides of the casing; a water section comprising cross pipes with spray nozzles thereon disposed above and below the upper run of the belt, suitable header connections with gates for closing across the same, for the said nozzle connecting at the tail end to a fresh water supply and at the forward end to a circulation supply, a centrifugal water pump to deliver into the circulation supply, a screen for screening the used water in said circulation supply, and adjustable partitions to divide the casing in the water supply, the front part of which is drained to the sewer and the tail end being connected to drain to the circulation supply, co-operating for the purpose specified.

16. The process of peeling peaches or similar fruit consisting in, first, wetting the peeling of the peach, second, heating the surface thereof by steam jets, third, subjecting the surface to the action of a highly heated mist from a lye solution and agitating the mass of fruit to insure the distribution of the mist over the entire heated surface, and, fourth, at once spraying the said fruit when the peel thereon has become disintegrated, as specified.

17. The process of peeling peaches or similar fruit consisting in, first, heating the surface thereof by steam jets, second, subjecting the surface to the action of a highly heated mist from the lye solution and agitating the mass of fruit to insure the distribution of the mist over the entire heated surface, and, third, at once spraying the said fruit when the peel thereon has become disintegrated, as specified.

18. The process of peeling peaches or similar fruit consisting in subjecting the surface to the action of a highly heated mist from a lye solution and agitating the mass of fruit to insure the distribution of the mist over the entire surface, and spraying the said fruit when the peel thereon has become disintegrated, as specified.

19. The process of peeling peaches or similar fruit consisting in heating the surface thereof by steam jets, subjecting the surface to the action of a highly heated mist from a lye solution, and spraying the said fruit when the peel thereon has become disintegrated, as specified.

20. The process of peeling peaches or similar fruit consisting in subjecting the surface to the action of a highly heated mist from a lye solution, and spraying the said fruit when the peel thereon has become disintegrated, as specified.

21. The process of peeling peaches or similar fruit consisting in, first, wetting the peeling of the peach, second, heating the surface thereof by steam jets, third, subjecting the surface to the action of a highly heated spray from a lye solution and agitating the mass of fruit to insure the distribution of the spray over the entire heated surface, and, fourth, at once spraying the said fruit with water when the peel thereon has become disintegrated, as specified.

22. The process of peeling peaches or similar fruit consisting in, first, heating the surface thereof by steam jets, second, subjecting the surface to the action of a highly heated spray from the lye solution and agitating the mass of fruit to insure the distribution of the spray over the entire heated surface, and, third, at once spraying the said fruit with water when the peel thereon has become disintegrated, as specified.

23. The process of peeling peaches or similar fruit consisting in subjecting the surface to the action of a highly heated spray from a lye solution and agitating the mass of fruit to insure the distribution of the spray over the entire surface, and spraying the said fruit with water when the peel thereon has become disintegrated, as specified.

24. The process of peeling peaches or similar fruit consisting in heating the surface thereof by steam jets, subjecting the surface to the action of a highly heated spray from a lye solution, and spraying the said fruit with water when the peel thereon has become disintegrated, as specified.

25 The process of peeling peaches or similar fruit consisting in subjecting the surface to the action of a highly heated spray from a lye solution, and spraying the said fruit with water when the peel thereon has become disintegrated, as specified.

In witness whereof, I have hereunto set my hand and seal in the presence of two witnesses.

SAMUEL J. DUNKLEY. [L. S.]

Witnesses:
LUELLA G. GREENFIELD,
MARTHA J. GREGORY.